Dec. 3, 1963    W. J. DUTTON    3,112,941
ROTOR SHAFT NUT
Filed Oct. 20, 1961    2 Sheets-Sheet 1

INVENTOR
WALTER J. DUTTON

BY

ATTORNEYS
AGENT

INVENTOR
WALTER J. DUTTON

3,112,941
ROTOR SHAFT NUT
Walter J. Dutton, Derby, Conn., assignor, by mesne assignments, to the United States of America as represented by the Secretary of the Navy
Filed Oct. 20, 1961, Ser. No. 146,667
3 Claims. (Cl. 287—53)

The present invention relates to a helicopter rotor assembly and more particularly to a helicopter rotor assembly which is more easily assembled and disassembled on the rotor drive shaft.

It has been the general practice in the art to secure a helicopter rotor head assembly to the rotor drive shaft by means of a large rotor nut which would act on the rotor hub forcing it down onto the rotor drive shaft. In order to secure the rotor nut on the drive shaft a large hydraulically operated wrench was employed to take up on the large rotor nut. As can readily be seen, such a tool would be quite cumbersome to handle and in many instances is not available for field or emergency use.

An object of the present invention is the provision of a rotor head mounting nut assembly which is easy to adapt to presently used rotor heads and is relatively inexpensive.

A further object of the invention is to eliminate the need for a large hydraulically opearted shaft wrench and permit the use of hand tools.

Another object of the invention is to provide a rotor head mounting nut assembly which provides a more uniform and accurate loading.

Still another object of the invention is the provision of a rotor nut assembly which permits the rotor head to be more readily disassembled from the rotor drive shaft as is required for inspection and maintenance check-ups.

Other objects and many of the attendant advantages of this invention will be readily appreciated as the same becomes better understood by reference to the following detailed describtion when considered in connection with the accompanying drawings wherein.

Figure 1:
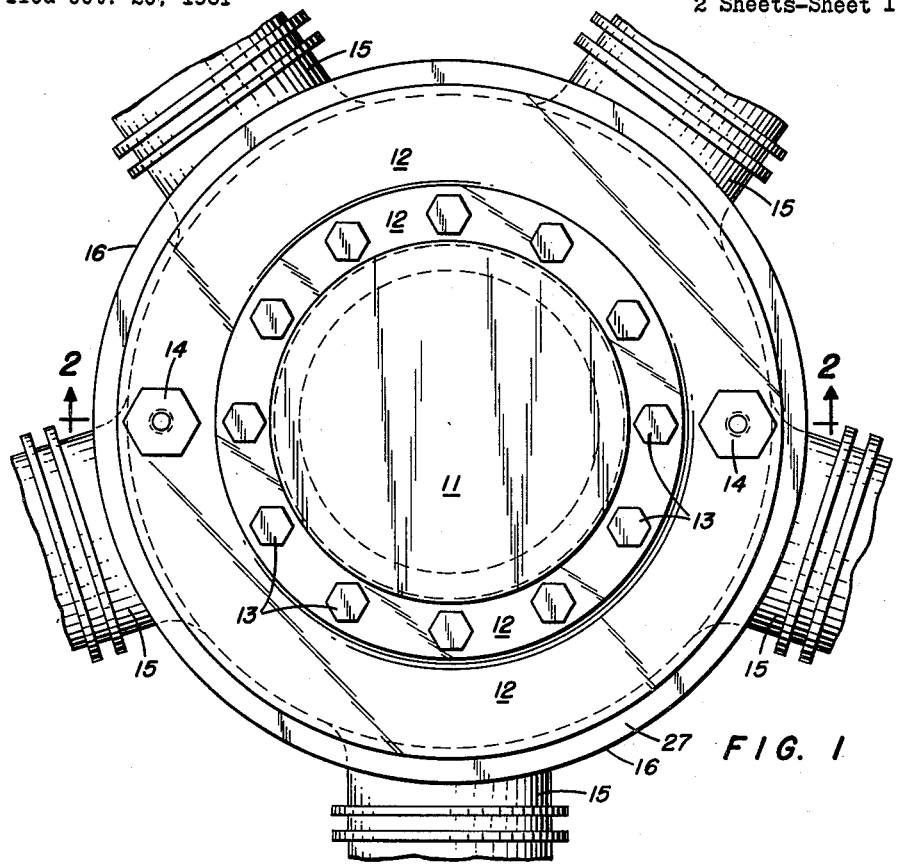
FIG. 1 shows a plan view of a rotor head assembly including the blade housings.

Referring now to the drawings, wherein like reference characters designate like or corresponding parts throughout the several views, there is shown in FIG. 1, which is a plan view of a preferred embodiment, a rotor drive shaft 11 which receives rotor head mounting nut 12. The mounting nut 12 is provided with a plurality of bores for receiving a concentric ring of compression bolts 13. Radially outward of compression bolts 13 are a pair of combination locking/lifting bolts 14. Although only two such locking/lifting bolts 14 are shown additional bolts may be added if found necessary. Also shown in FIG. 1 are a plurality of blade supporting arms 15 which are integral with and project radially from the rotor hub 16. Any suitable means of securing the rotor blades (not shown) to the rotor hub 16 may be used. It is to be noted that the number of supporting arms 15 is not a material factor to the instant invention. Although five radial arms 15 are shown, any number may be employed depending on the type of helicopter this invention is to be used on.

Figure 2:
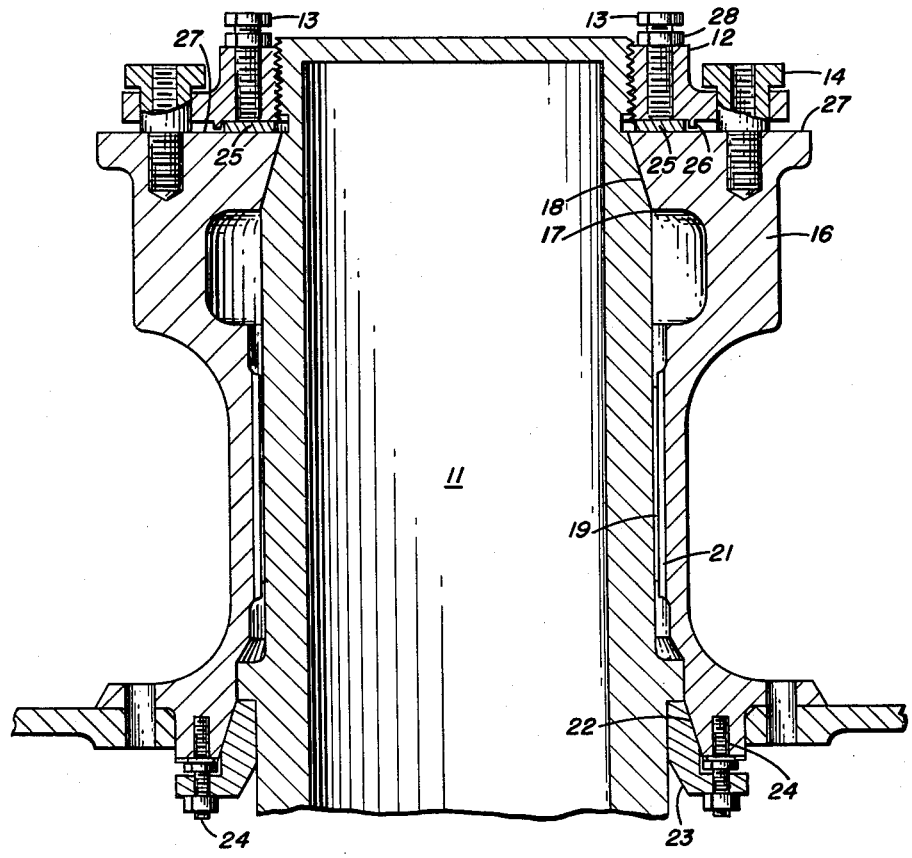
FIG. 2 is a sectional view taken along the line 2—2 of FIG. 1 showing the hub in its secured position.

FIG. 2 is a sectional view taken on the line 2—2 of FIG. 1. This view illustrates the relationship of the hollow drive shaft 11 with that of the rotor hub 16 and the rotor head mounting nut 12. The rotor drive shaft 11 is of substantially uniform diameter to point 17 where it begins to taper inwardly presenting a conical shoulder 18. The rotor drive shaft is threaded at its uppermost end to receive the rotor mounting nut 12. As can readily be seen, the rotor drive shaft 11 is provided with a plurality of splines 19 on its outer surface. These splines 19 are adapted to receive and cooperate with the hub splines 21. The lowermost end of the hub 16 is provided with an outwardly tapered portion 22 for receiving the lower cone 23. The lower cone 23 is fixedly secured to the rotor hub by means of a plurality of locking bolts 24 and has a flat inner end engaging against an external flange on the drive shaft 11. The lower cone 23 is placed upon the shaft 11 before the rotor drive shaft 11 is secured to a driving apparatus such as an internal combustion engine.

In order to secure the rotor hub 16 to the drive shaft 11 the hub 16 is first placed onto the shaft 11. At this point, the locking/lifting bolts 14 are removed from the rotor nut 12. Then the dog plate 25 is concentrically placed around shaft 11. Next, the rotor nut 12 is threaded onto the threaded end of the shaft 11. At this time, the compression bolts 13 are backed off sufficiently to have the underside of the nut 12 come into contact with the dog plate 25. The underside of the nut 12 is provided with stops 26 to prevent the dog plate 25 from sliding around prior to the fastening of the nut 12. After the nut 12 has been brought into contact with the dog plate 25 the compression bolts 13 are tightened. In tightening compression bolts 13 the end of the bolt 13 exerts a downward force on the dog plate 25 which in turn exerts a force on the upper face 27 of the rotor hub 16. This downward force urges the hub 16 onto the conical shoulder 18 of the main rotor drive shaft 11. By means of compression bolts 13 and dog plate 25 the rotor hub 16 is fixedly secured to the shaft 11. After the compression bolts 13 are fully taken up, then the locking nut 28 is fastened to prevent the bolt 13 from loosening. As a further precaution against loosening of the main rotor nut 12 locking/lifting bolts 14 are inserted into the rotor nut 12 and the upper face 27 of hub 16 to prevent relative rotation therebetween. At this point in the assembly operation, the lower cone 23 is held against the flange on the drive shaft 11 while the locking bolts 24 are tightened to fixedly secure the lower cone 23 to the rotor hub. By securing the lower cone 23 to the hub in this manner, the hub is secured to the rotor shaft 11 at the flange area.

Figure 3:
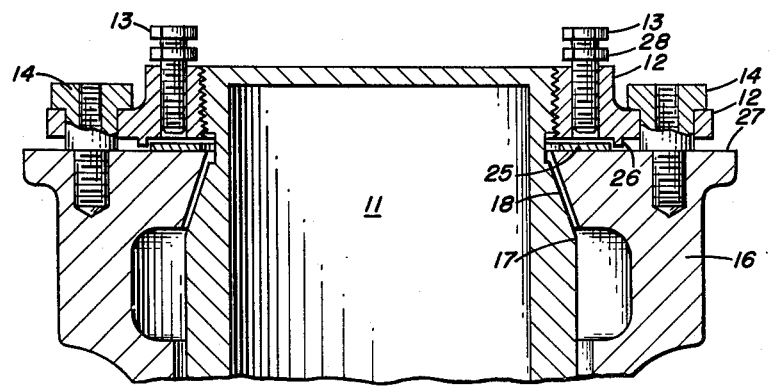
FIG. 3 is a sectional view taken along the line 2—2 of FIG. 1 with the rotor hub in its raised position.

FIG. 3 is a view taken along the same line 2—2 of FIG. 2, however, FIG. 3 illustrates the relative position of the rotor shaft 11 with respect to the rotor hub 16 when the hub 16 is being removed from shaft 11 for any desired reason.

In removing the rotor hub 16 from drive shaft 11 the locking/lifting bolts 14 are removed from the nut 12 and hub 16. Then the compression bolts 13 and rotor nut 12 are backed off several turns, after this is done, the locking/lifting bolts 14 are re-inserted into the nut 12 and hub 16. The threading of locking/lifting bolts 14 into the hub 16 exerts a lifting force on said hub 16 and will raise it sufficiently to break it loose from its splined connection with drive shaft 11.

It can readily be seen that the instant invention provides a rotor locking/lifting device which eliminates the need for a large hydraulically operated shaft wrench, as was required prior to applicant's invention and which is equally applicable to all rotating machinery hubs, as flywheels, brake drums, gears, and pulleys. In addition to permitting the use of smaller hand tools, the instant invention provides a more uniform and accurate loading in placing the rotor hub 16 or the rotor shaft 11.

Obviously many modifications and variations of the present invention are possible in the light of the above teachings. It is therefore to be understood that within the scope of the appended claims the invention may be practiced otherwise than as specifically described.

What is claimed is:

1. In a rotor head mounting assembly comprising a rotor drive shaft, said drive shaft being of uniform diameter with a taper near its upper end and an external flange spaced downwardly from said taper, a threaded portion beginning at the smallest diameter portion of said taper and extending the remaining length of the shaft, said rotor shaft being splined about its outer surface, a rotor hub received by said rotor shaft, said rotor hub having a bore with a first tapered portion at its upper end conforming to the taper on said rotor shaft, a second tapered portion at the lower end of the bore of said rotor hub, a rotor nut threadably received by said rotor shaft, a lower cone operably mounted on said rotor shaft, said lower cone having an outward tapered portion conforming to and mating with said second tapered portion of said rotor hub and a flat end portion for engagement with the lower side of said external flange on the drive shaft, said lower cone being fixedly secured to said lower portion of said rotor hub, means operatively connected to said rotor nut for exerting a uniform force on said rotor hub and additional means operatively connected to said rotor nut and said rotor hub for assisting in the securing and releasing of said rotor hub to and from said rotor shaft whereby a uniform pressure is applied to said rotor hub during the securing and releasing of said hub to said drive shaft.

2. In a rotor head mounting assembly as recited in claim 1 wherein said first means consists of a plurality of compression bolts spaced radially about said rotor nut and a dog plate inserted between said rotor nut and said rotor hub in concentric relation to said drive shaft whereby tightening said compression bolts exert a downward force on said dog plate thus applying a uniform force to said rotor hub.

3. In a rotor head mounting assembly as recited in claim 1 wherein said additional means for securing said rotor nut to said hub consists of a plurality of combination locking and lifting bolts which are inserted through a bore in said rotor nut into a threaded bore in said rotor hub whereby relative rotation between said hub and said nut is prevented and said hub can readily be released from said drive shaft when desired.

References Cited in the file of this patent

UNITED STATES PATENTS

| | | |
|---|---|---|
| 2,278,625 | Traylor et al. | Apr. 7, 1942 |
| 2,418,396 | Carr et al. | Apr. 1, 1947 |
| 2,899,222 | Ross | Aug. 11, 1959 |
| 3,033,597 | Miller | May 8, 1962 |

FOREIGN PATENTS

| | | |
|---|---|---|
| 572,615 | Great Britain | Oct. 16, 1945 |